United States Patent
Sano et al.

(10) Patent No.: US 8,287,267 B2
(45) Date of Patent: Oct. 16, 2012

(54) SHEET FORMING APPARATUS AND SHEET FORMING METHOD

(75) Inventors: Takayoshi Sano, Fuji (JP); Masaru Taguchi, Numazu (JP); Takashi Hirose, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 61 days.

(21) Appl. No.: 12/473,513

(22) Filed: May 28, 2009

(65) Prior Publication Data
US 2009/0295017 A1 Dec. 3, 2009

(30) Foreign Application Priority Data

May 28, 2008 (JP) ................... 2008-139631

(51) Int. Cl.
B29C 55/02 (2006.01)
(52) U.S. Cl. ........................ 425/367; 425/363
(58) Field of Classification Search .............. 425/337, 425/335, 363, 367, 409; 264/212
See application file for complete search history.

(56) References Cited

U.S. PATENT DOCUMENTS

| | | | | |
|---|---|---|---|---|
| 4,064,929 | A * | 12/1977 | Quehen et al. | 164/433 |
| 4,086,045 | A * | 4/1978 | Thiel et al. | 425/326.1 |
| 5,397,526 | A * | 3/1995 | Perkins et al. | 264/175 |
| 6,210,145 | B1 * | 4/2001 | Seide | 425/194 |
| 2006/0211556 | A1 | 9/2006 | Sano | |
| 2007/0063376 | A1 | 3/2007 | Sano et al. | |
| 2009/0186168 | A1 * | 7/2009 | Nitta et al. | 428/1.1 |

FOREIGN PATENT DOCUMENTS

| | | |
|---|---|---|
| CN | 1834567 A | 9/2006 |
| DE | 102006012398 | 9/2006 |
| DE | 102006044463 | 5/2007 |
| JP | H08-230018 | 9/1996 |
| JP | 10-180847 | 7/1998 |
| JP | 11-235747 | 8/1999 |
| JP | 3194904 B2 | 8/2001 |
| JP | 2006-256159 | 9/2006 |
| JP | 2007-083577 | 4/2007 |
| TW | 324686 | 1/1998 |
| WO | WO 2007/141899 | * 12/2007 |

OTHER PUBLICATIONS

Notice of Allowance issued in counterpart Taiwan Application No. 096147234 on Jan. 27, 2010.
Search Report issued in counterpart Taiwan Application No. 096147234 on Jan. 26, 2010.
English abstract of CN1834567A issued on Sep. 20, 2006.
Machine English language translation of JP 3194904B2 issued on Aug. 6, 2001.

(Continued)

*Primary Examiner* — Joseph Del Sole
*Assistant Examiner* — Kimberly A Stewart
(74) *Attorney, Agent, or Firm* — DLA Piper LLP US

(57) ABSTRACT

A sheet forming apparatus includes a first roll, a second roll configured to sandwich molten resin extruded from a die in cooperation with the first roll, a coupling member provided to be revolvable around a rotation center axis of the second roll, a third roll provided rotatably on the coupling member and configured to sandwich the resin conveyed along an outer periphery of the second roll in cooperation with the second roll, and a coupling member supporter configured to support the coupling member at an intermediate part of the coupling member so as to allow the coupling member to revolve.

4 Claims, 9 Drawing Sheets

OTHER PUBLICATIONS

English abstract of TW324686 issued on Jan. 11, 1998.
English abstract of JP-H08-230018.
Machine English language translation of JP-H08-230018.
English abstract of JP-2006-256159 published Sep. 28, 2006.
Machine English language translation of JP-2006-256159 published Sep. 28, 2006.
English abstract of JP-2007-083577 published Apr. 5, 2007.
Machine English language translation of JP-2007-083577 published Apr. 5, 2007.
English abstract of JP-11-235747 published Aug. 31, 1999.
Machine English language translation of JP-11-235747 published Aug. 31, 1999.
Korean Office Action issued in KR 10-2009-46328 issued on Nov. 19, 2010.
Partial English Translation of Korean Office Action issued in KR 10-2009-46328 issued on Nov. 19, 2010.
English Abstract of JP 10-180847 published Jul. 7, 1998.
English Translation of JP 10-180847 published Jul. 7, 1998.
Office Action issued in Taiwan Application 098117807 on May 3, 2012.
Partial English Language Translation of Office Action issued in Taiwan Application 098117807 on May 3, 2012.

* cited by examiner

SHEET FORMING APPARATUS AND SHEET FORMING METHOD

BACKGROUND OF THE INVENTION

1. Field of the Invention

The present invention relates to a sheet forming apparatus and a sheet forming method, and more particularly, to an apparatus and a method for forming resin coming out of a die into a sheet shape by using rolls.

2. Description of the Related Art

There has heretofore been known a sheet forming apparatus configured to sandwich resin coming out of a die between a first roll and a second roll and then to cause the resin to contact the second roll for a predetermined length in a circumferential direction of the second roll, the predetermine length being made variable by use of a third roll that revolves around the second roll. This technique is disclosed in Japanese Patent Application Laid-Open No. Hei 8-230018 (Patent Document 1), for example.

While each of the rolls has a function to cool down the resin coming out of the die, the predetermined length (a contact length of the resin with the second roll) is appropriately changed to prevent crystallization of the resin as well as to ensure transparency and homogeneity of the resin in the case where the resin is any of thermoplastic resins, in particular, olefin resins such as polypropylene or polyethylene.

Incidentally, the third roll of the conventional sheet forming apparatus is configured to revolve around the second roll while supported by a coupling member. However, this supporting style has a problem of degradation in positioning accuracy of the third roll when the resin is sandwiched between the second roll and the third roll with a high pressure.

SUMMARY OF THE INVENTION

The present invention has been made in view of the foregoing problem. In this context, an object of the present invention is to provide a sheet forming apparatus and a sheet forming method which are capable of ameliorating positioning accuracy of a third roll. The sheet forming apparatus sandwiches resin coming out of a die between a first roll and a second roll and then to cause the resin to contact the second roll for a predetermined length in a circumferential direction thereof, the predetermine length being made variable by use of the third roll that revolves around the second roll.

To attain the object, a first aspect of the present invention provides a sheet forming apparatus configured to obtain a formed product in a sheet shape by cooling and solidifying molten resin, which includes: a first roll configured to rotate relative to a frame; a second roll configured to rotate relative to the frame and to sandwich sheet-shaped molten resin extruded from a die in cooperation with the first roll; a coupling member having one end side supported by any of the frame and the second roll, the coupling member provided to be revolvable, relative to any of the frame and the second roll, around a rotation center axis of the second roll; a third roll provided on another end side of the coupling member so as to be rotatable relative to the coupling member, the third roll configured to revolve around the rotation center axis of the second roll by way of revolution of the coupling member and to sandwich the resin in cooperation with the second roll, the resin conveyed along an outer periphery of the second roll by rotation of the second roll after being sandwiched between the first roll and the second roll, in cooperation with the second roll; and a coupling member supporter configured to support the coupling member at an intermediate part or on the other end side of the coupling member so as to allow the coupling member to revolve relative to the frame.

A second aspect of the present invention provides the sheet forming apparatus of the first aspect, which further includes: a coupling member revolution positioning unit configured to revolve and position the coupling member by applying a torque to the coupling member at the intermediate part or on the other end side of the coupling member.

A third aspect of the present invention provides the sheet forming apparatus of the second aspect, in which the second roll is rotatably supported by the frame with bearings on both end sides in a direction of extension of the rotation center axis of the second roll, the coupling member includes a first coupling member and a second coupling member, one end side of the first coupling member is supported by the frame with a bearing provided at a position where the bearing that supports the one end side of the second roll is provided or in the vicinity of the position, in the direction of extension of the rotation center axis of the second roll, one end side of the second coupling member is supported by the frame with a bearing provided at a position where the bearing that supports the other end side of the second roll is provided or in the vicinity of the position, in the direction of extension of the rotation center axis of the second roll, and the first coupling member and the second coupling member are configured to be revolved synchronously with each other by use of the coupling member revolution positioning unit.

A fourth aspect of the present invention provides the sheet forming apparatus of any one aspect of the first aspect to the third aspect, in which rotating center axes of the respective rolls extend in a horizontal direction and the die is provided above the first roll and the second roll, a molten resin extrusion port of the die is located immediately above a contact portion of the first roll and the second roll, and an adjuster configured to adjust a distance from the contact portion of the first roll and the second roll to the die is provided.

A fifth aspect of the present invention provides a sheet forming method to be executed by use of the sheet forming apparatus according to any one aspect of the first aspect to the fourth aspect.

According to the present invention, the sheet forming apparatus, which is configured to sandwich resin coming out of a die between a first roll and a second roll and then to cause the resin to contact the second roll for a predetermined length in a circumferential direction thereof while the predetermine length is variable by use of a third roll that revolves around the second roll, exerts an effect of ameliorating positioning accuracy of the third roll.

BRIEF DESCRIPTION OF THE ACCOMPANYING DRAWINGS

Figure 1:
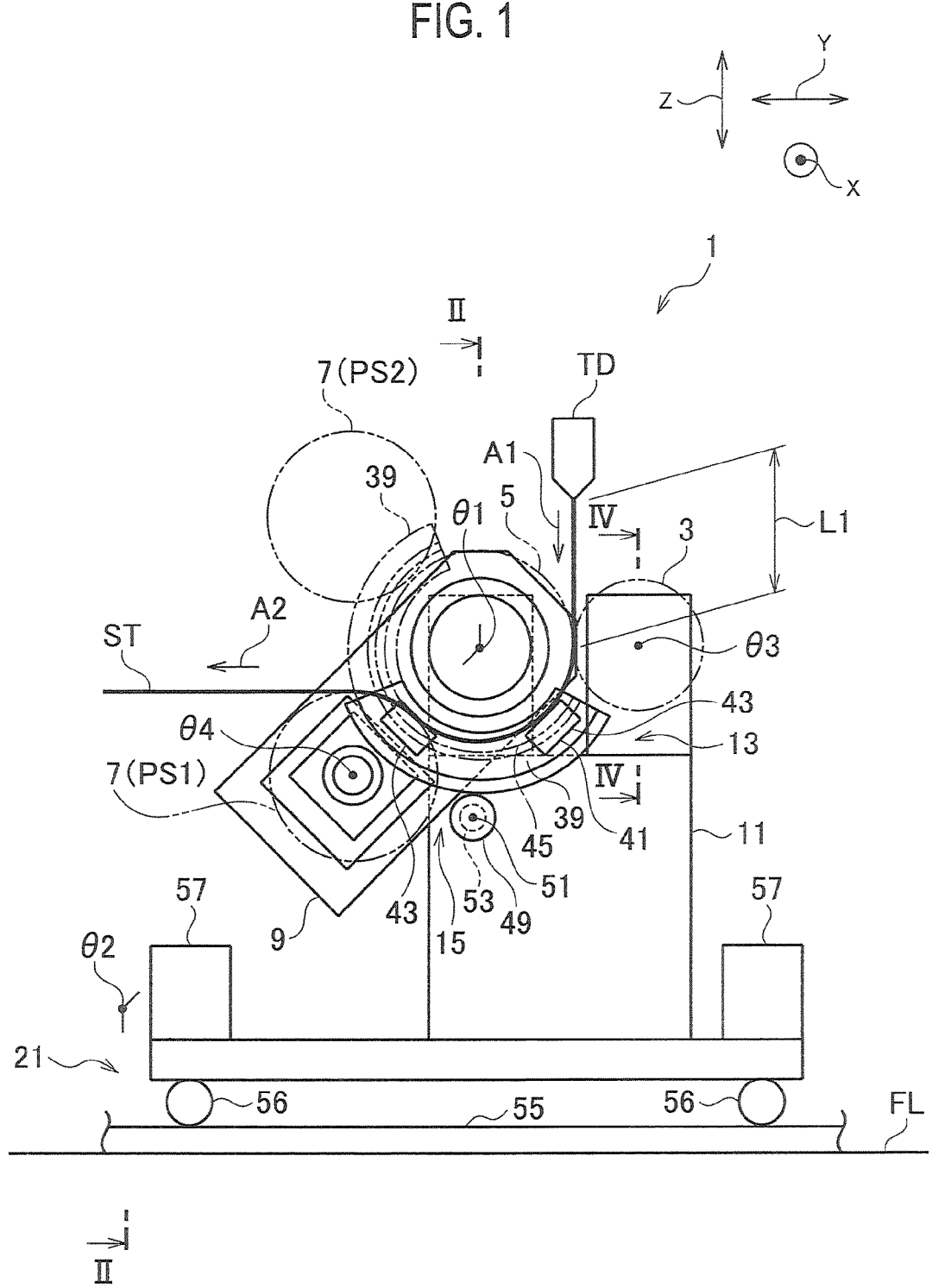
FIG. 1 is a side view showing a schematic configuration of a sheet forming apparatus 1 according to an embodiment of the present invention.
Figure 6:
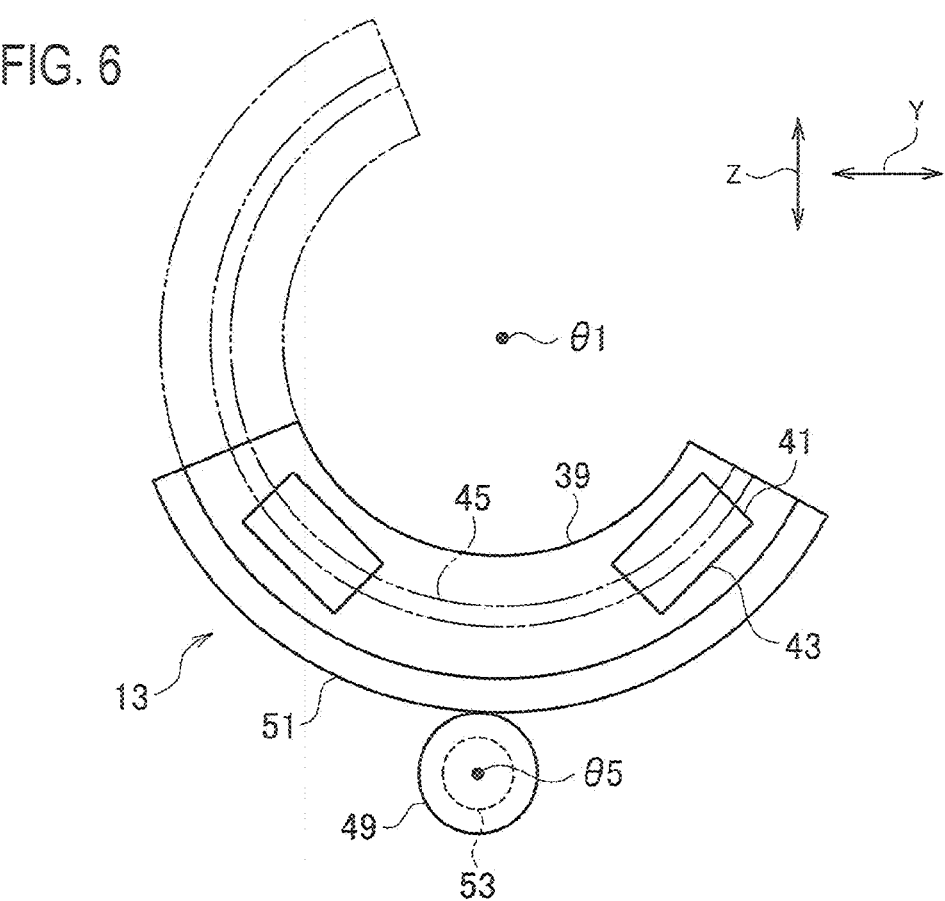

FIG. 6 is a view showing extracted illustration of a guide member 39, a guide bearing 41, a rack wheel 51, a pinion 49, and a coupling shaft member 53, which is the view corresponding to FIG. 1.

Figure 7:
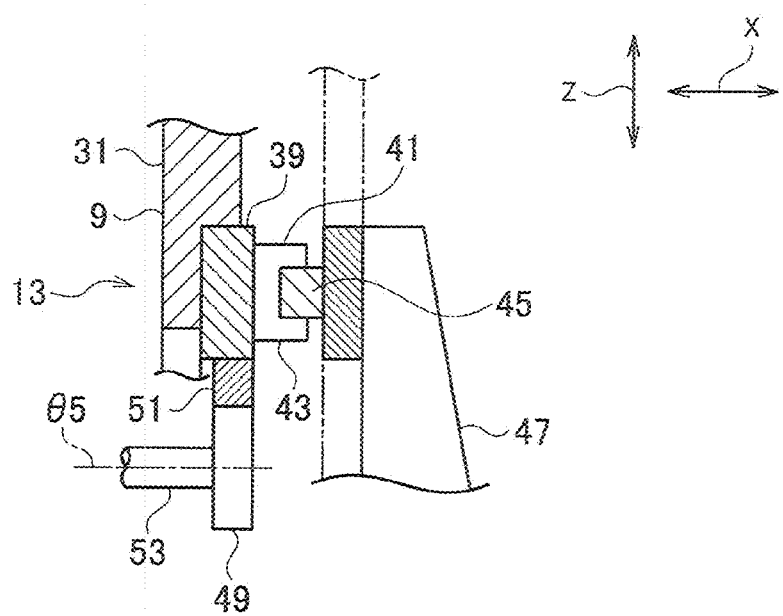

FIG. 7 is a schematic side view of FIG. 6.

Figure 8:
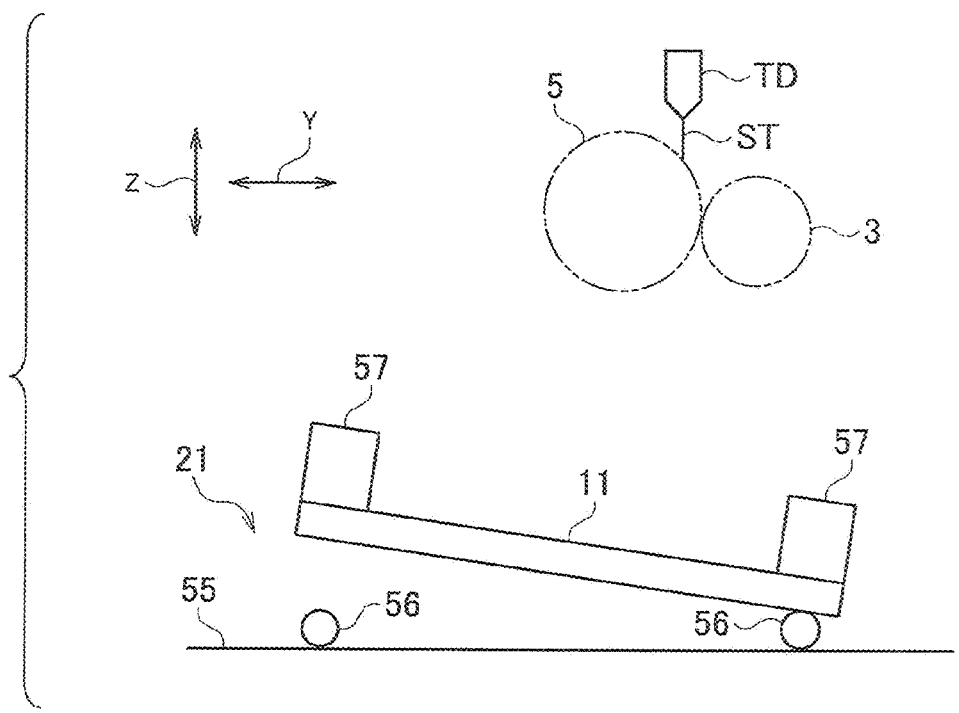

FIG. 8 is a view for explaining a case of adjusting a distance L1 between a die TD and a contact portion of rolls 3 and 5.

Figure 9:
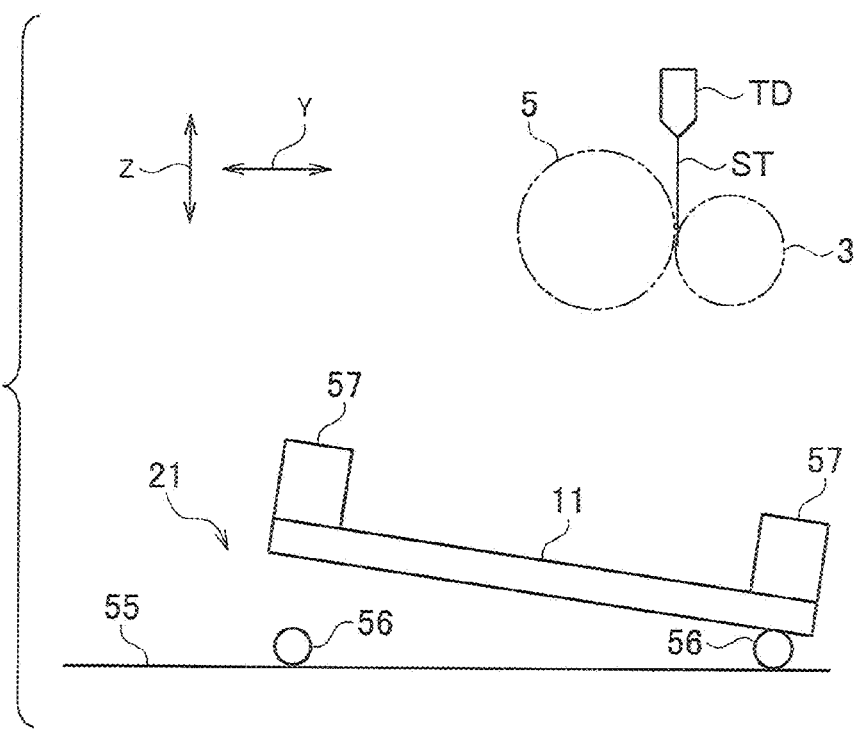

FIG. 9 is another view for explaining the case of adjusting the distance L1 between the die TD and the contact portion of the rolls 3 and 5.

Figure 10:
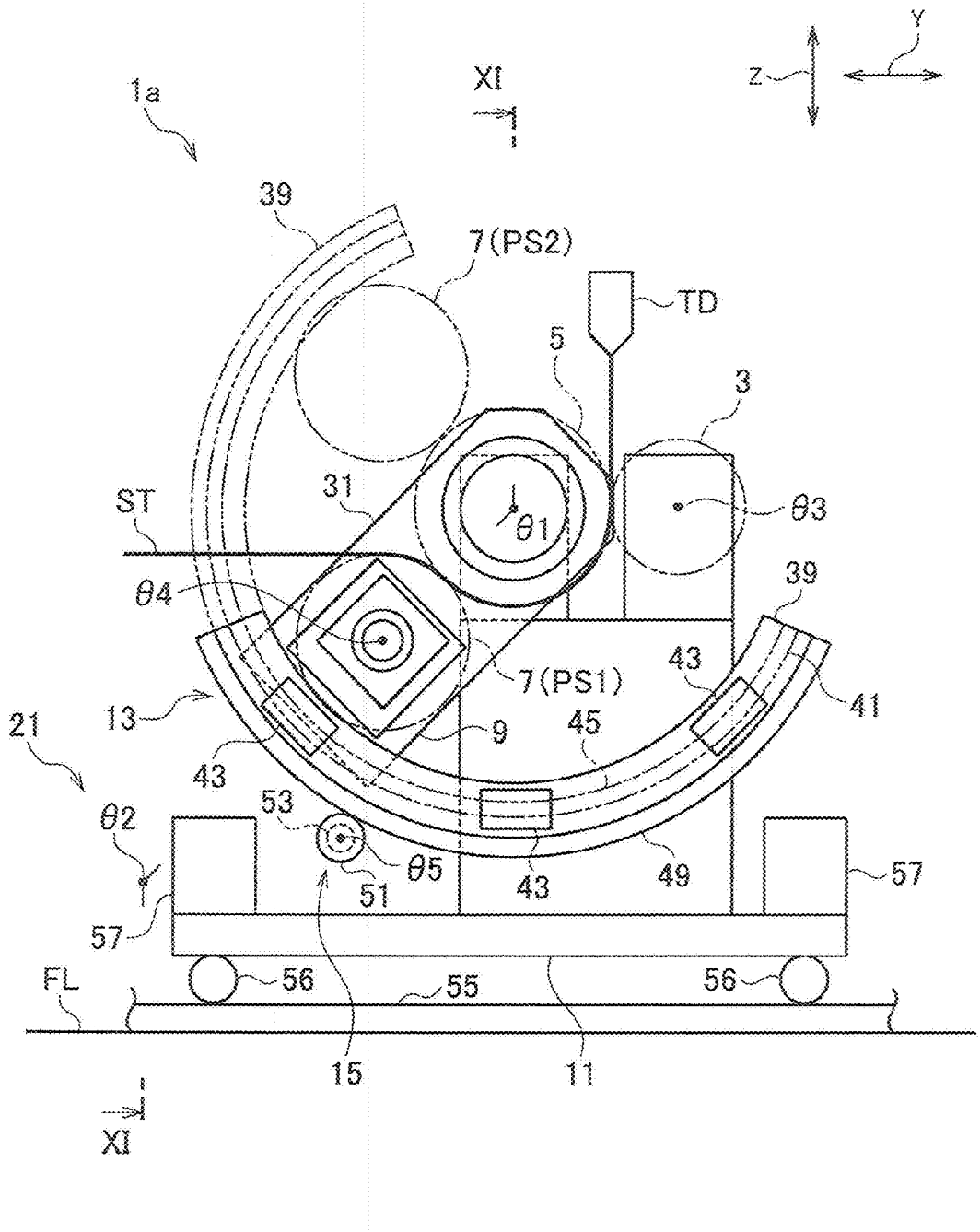

FIG. 10 is a side view showing a schematic configuration of a sheet forming apparatus 1a having increased radii of the guide member 39 and other constituents, which is a view corresponding to FIG. 1.

Figure 2:
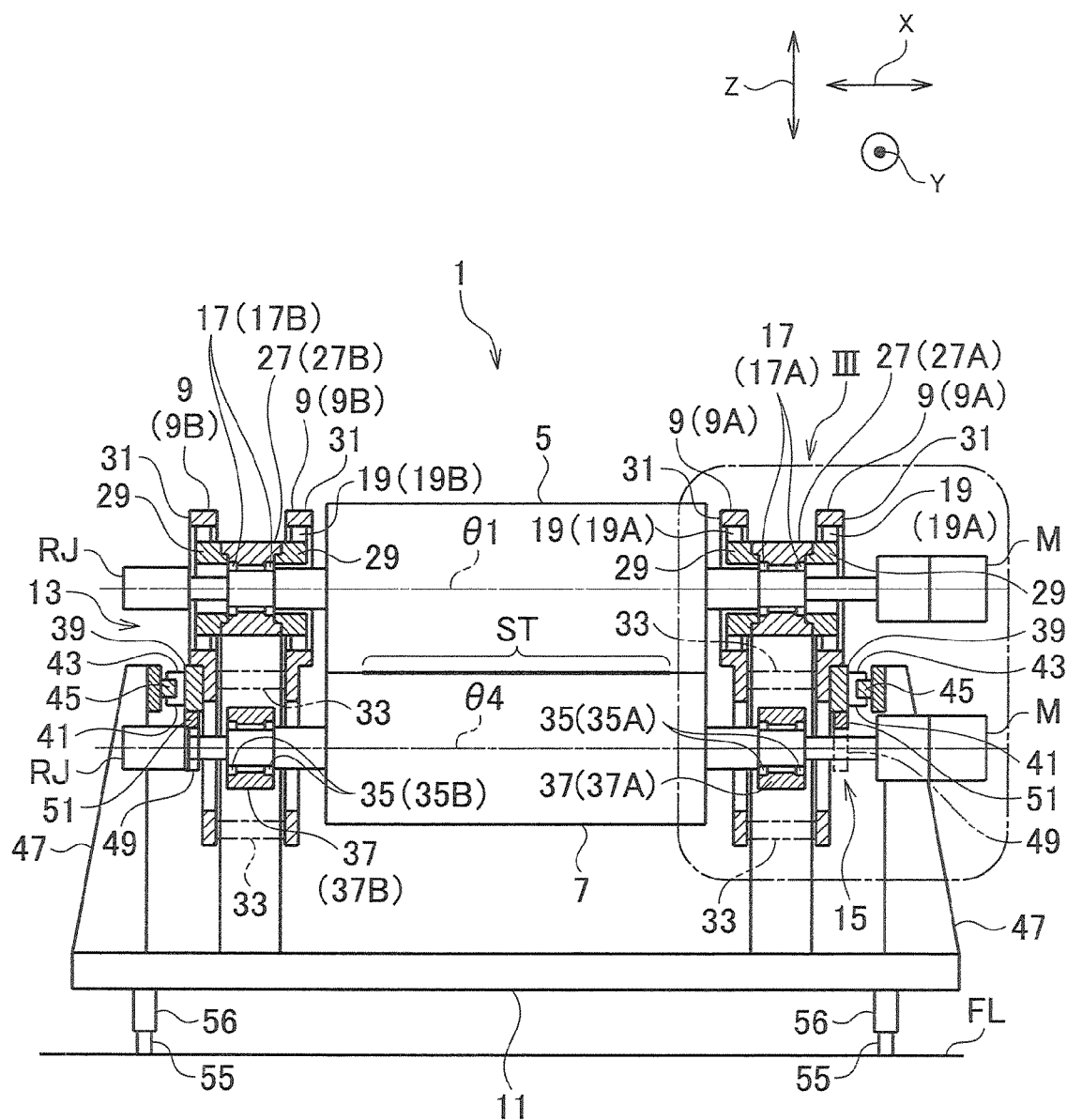
FIG. 2 is a view showing a cross-section taken along the II-θ1-θ4-θ2-II line in FIG. 1.
Figure 3:
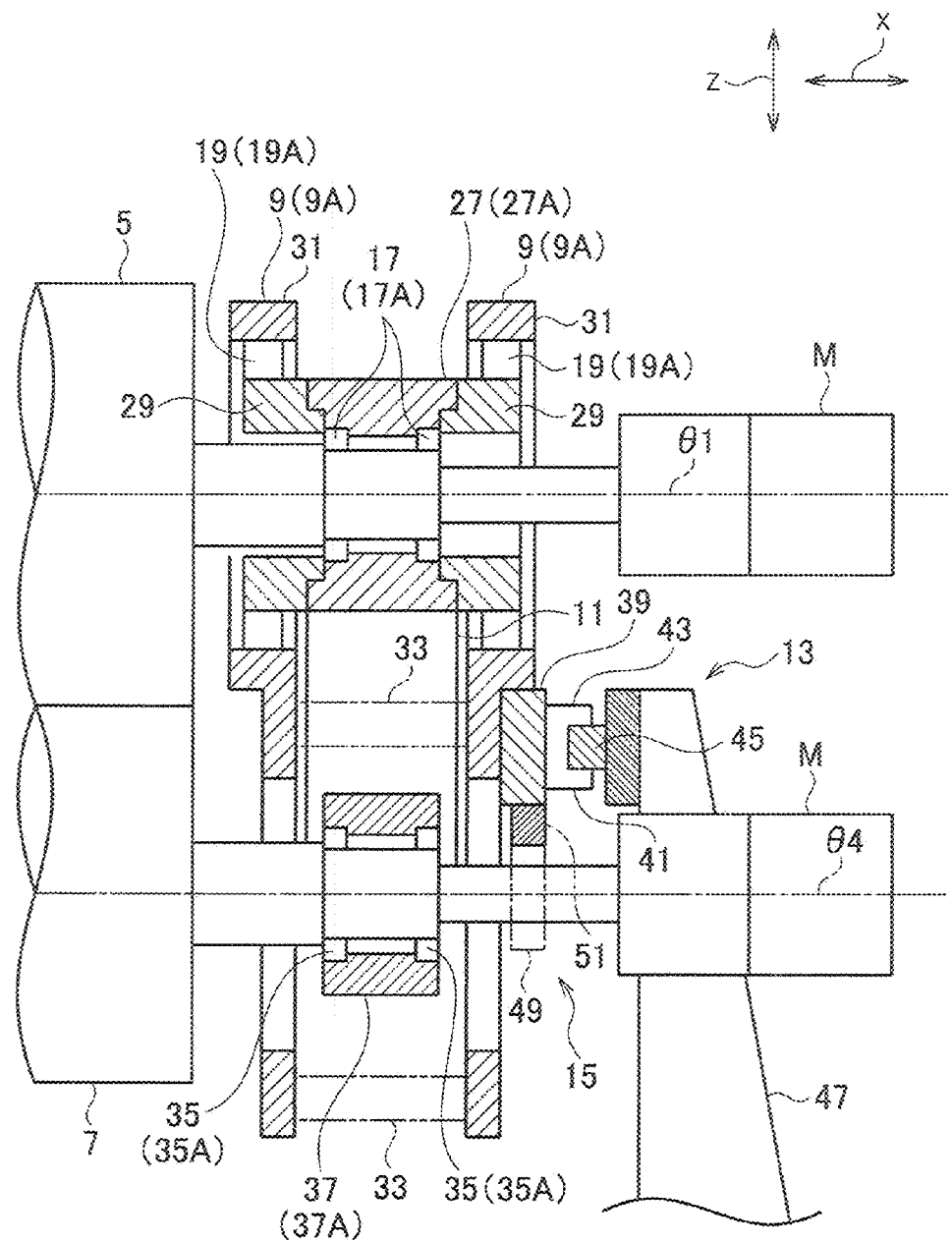
FIG. 3 is an enlarged view of a part III in FIG. 2.
Figure 11:
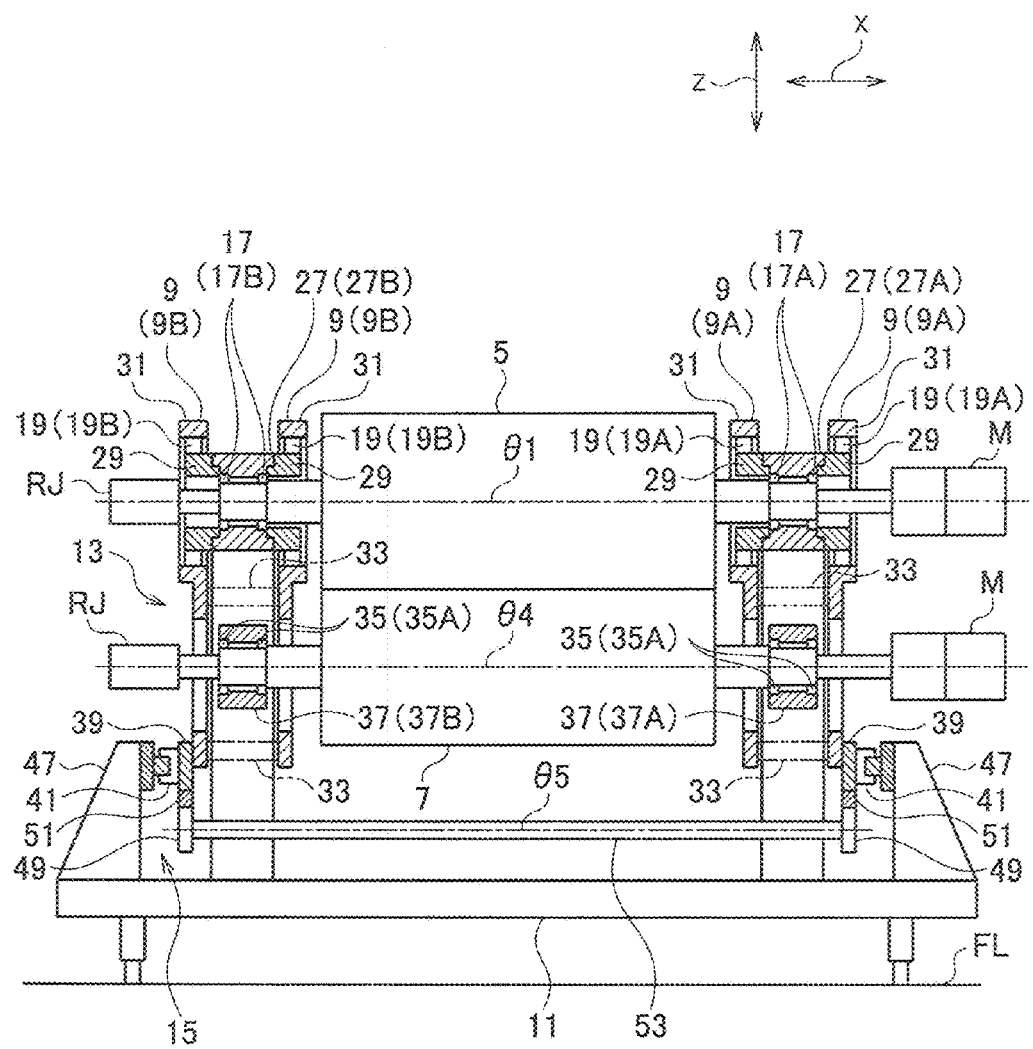

FIG. 11 is a view showing a cross-section taken along the XI-θ1-θ4-θ2-XI line in FIG. 10, which is the view corresponding to FIG. 2.

DETAILED DESCRIPTION OF THE PREFERRED EMBODIMENTS

Now, embodiments of the present invention will be described below based on the accompanying drawings.

It is to be noted that the following description is based on the assumptions that a direction in a horizontal direction is defined as an X-axis direction shown in the drawings as "X", that another horizontal direction perpendicular to the X-axis direction is defined as a Y-axis direction shown in the drawings as "Y", and that a vertical direction is defined as a Z-axis direction shown in the drawings as "Z".

A sheet forming apparatus 1 is an apparatus configured to obtain a formed product in a sheet shape by cooling and solidifying molten resin ST, the sheet forming apparatus 1 including a first roll 3, a second roll 5, a third roll 7, and a coupling member 9.

The first roll 3 is formed into a cylindrical shape and configured to rotate, relative to a frame 11, around a center axis θ3 that extends in the X-axis direction.

The second roll 5 is formed into a cylindrical shape and configured to rotate, relative to the frame 11, around a center axis θ1 that extends in the X-axis direction. Moreover, the second roll 5 is configured to sandwich sheet-shaped molten resin ST extruded from the die TD in a stretched manner in the X-axis direction (extruded in a direction of an arrow A1 in FIG. 1) in cooperation with the first roll 3.

The coupling member 9 has one end (a proximal end) side supported by the frame 11, and is provided to be revolvable (swingable), relative to the frame 11, around the rotation center axis θ1 of the second roll 5. Here, the one end side of the coupling member 9 may be supported by the second roll 5 and the coupling member 9 may be revolvable relative to the second roll 5 instead.

The third roll 7 is formed into a cylindrical shape and provided to be rotatable, on the coupling member 9 on another end (a distal end) side of the coupling member 9, around a center axis θ4 extending in the X-axis direction. Moreover, the third roll 7 is configured to revolve around the rotation center axis θ1 of the second roll 5 by way of revolution of the coupling member 9. Meanwhile, the second roll 5 and the third roll 7 cooperate to sandwich the resin ST which is conveyed along an outer periphery of the second roll 5 by way of rotation of the second roll 5 after being sandwiched between the first roll 3 and the second roll 5.

Here, the resin ST sandwiched by the second roll 5 and the third roll 7 is then sent to a direction to recede from the rolls 3, 5, and 7 as indicated with an arrow A2 in FIG. 1.

Moreover, the sheet forming apparatus 1 is provided with a coupling member supporter 13. The coupling member supporter 13 includes a mechanism which is configured to support the coupling member 9 either at an intermediate part or on the other end side of the coupling member 9 (either at the intermediate part or a part closer to the rotation center axis θ4 in a direction of connecting the rotation center axis θ1 of the second roll 5 to the rotation center 4 of the third roll 7; or on the outside of the outer periphery of the second roll 5, for example) so that the coupling member 9 revolves around the center axis θ1 relative to the frame 11.

Here, the rolls 3, 5, and 7 are configured to be rotated by an actuator such as a motor M when sandwiching the resin ST and thereby to pull and send the sheet-shaped resin ST.

Further, the sheet forming apparatus 1 is provided with a coupling member revolution positioning unit 15. The coupling member revolution positioning unit 15 includes a mechanism which is configured to revolve and position the coupling member 9 by applying a torque to the coupling member 9 either at the intermediate part or on the other end side of the coupling member 9 (on the outside of the outer periphery of the second roll 5 and further on the outside of a supporting part of the coupling member supporter 13, for example).

The sheet forming apparatus 1 will now be described further in detail.

The second roll 5 is rotatably supported by the frame 11 with bearings 17 on both end sides in a direction of extension of the rotation center axis θ1. The coupling member 9 includes a first coupling member 9A located on the right side in FIG. 2 and a second coupling member 9B located on the left side in FIG. 2.

One end side (one end side in the direction of connecting the rotation center axis θ1 to the rotation center axis θ4; the one end side in a radial direction of the roll 5 or the roll 7) of the first coupling member 9A is supported by the frame 11 with a bearing 19 (19A). The bearing 19 (19A) is provided at a position where the bearing 17 (17A) supporting the one end side of the second roll 5 is provided or in the vicinity of this position, in the direction of extension of the rotation center axis θ1 of the second roll 5.

As similar to the first coupling member 9A, the second coupling member 9B is supported by the frame 11 with a bearing 19 (19B) provided at a position where the bearing 17 (17B) supporting the other end side of the second roll 5 is provided or in the vicinity of this position, in the direction of extension of the rotation center axis θ1 of the second roll 5.

The first coupling member 9A and the second coupling member 9B are configured to be rotated synchronously with each other by the coupling member revolution positioning unit 15.

A die TD is provided above the first roll 3 and the second roll 5, and a molten resin extrusion port (the molten resin extrusion port that extends in the same direction (the Y-axis direction) as the direction of extension of the rotation center axes θ3 and θ1 of the respective rolls 3 and 5) of the die TD is located immediately above a contact portion (a portion for sandwiching the molten resin ST coming out of the die TD) of the first roll 3 and the second roll 5.

Moreover, the sheet forming apparatus 1 is provided with an adjuster 21. This adjuster 21 is configured to adjust a distance between the die TD and the contact portion of the first roll 3 and the second roll 5 so as to locate the molten resin extrusion port immediately above the contact portion of the first roll 3 and the second roll 5.

Incidentally, each of the rolls 3, 5, and 7 is provided with a cooling mechanism for cooling the resin ST (which may be a heating mechanism capable of heating the resin ST or a temperature control mechanism configured to adjust and control the temperature instead). For example, a rotary joint RJ is provided on the one end side of the second roll 5 and a cooling medium (which may be a heating medium or a temperature control medium instead) is supplied to the second roll 5 and collected from the second roll 5 through this rotary joint RJ. The cooling medium is configured to circulate between a cooling device (which may be a heating device or a temperature control device instead) that is provided outside the sheet forming apparatus 1 and each of the rolls 3, 5, and 7.

Figure 4:
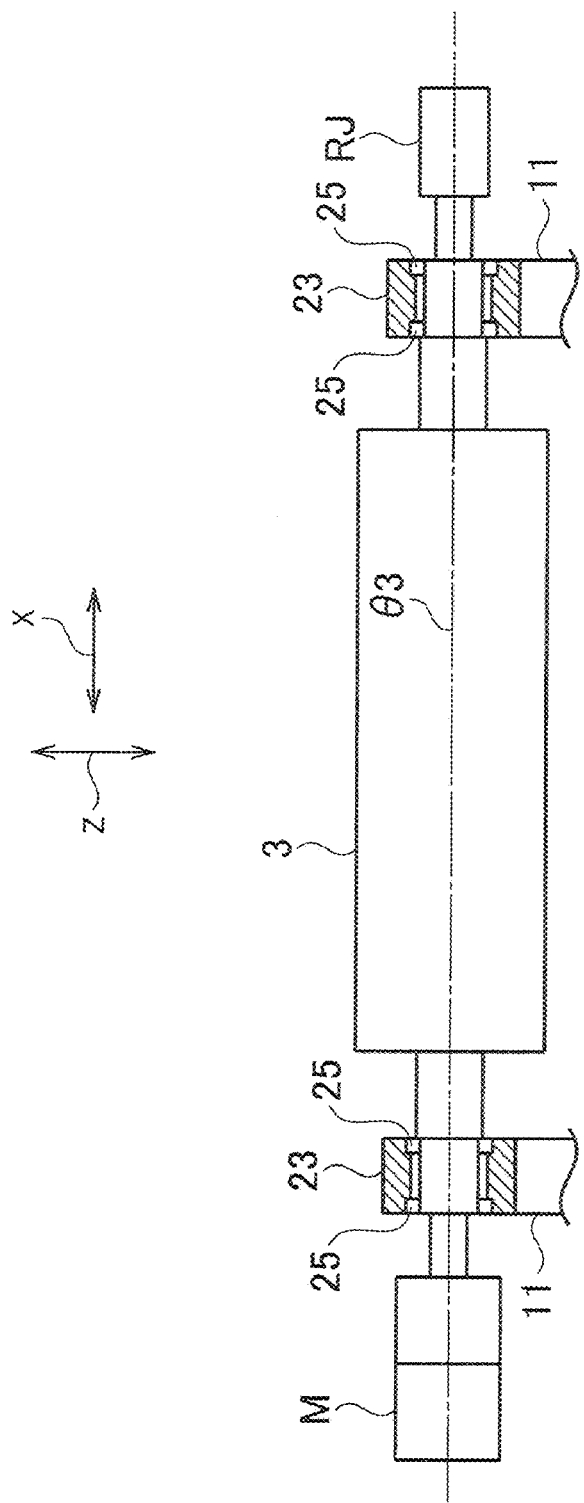
FIG. 4 is a view showing a cross-section taken along the IV-IV line in FIG. 1.

Moreover, as shown in FIG. 2 and FIG. 4, the sheet forming apparatus 1 is formed substantially symmetrically with respect to central planes (YZ planes) of the rolls 3, 5, and 7.

One end side of the first roll 3 is supported by the frame 11 with a bearing 25 provided on a bearing holder 23 as shown in FIG. 4. The bearing holder 23 is integrally provided on the frame 11. Another end side of the first roll 3 is supported similarly. Moreover, the second roll 5 is supported by the frame 11 with the bearings 17 provided on bearing holders 27, similarly to the first roll 3 (see FIG. 1).

An outside diameter of the first roll 3 is smaller than an outside diameter of the second roll 5, and a distance between the rotation center axis $\theta 3$ of the first roll 3 and the rotation center axis $\theta 1$ of the second roll 5 is substantially equal to a sum of a radius of the first roll 3 and a radius of the second roll 5 so that the first roll 3 and the second roll 5 sandwich the molten resin ST coming out of the die TD.

A ring-shaped bearing shaft member 29 is integrally provided on a bearing holder 27A that supports the one end side (the right side in FIG. 2) of the second roll 5. As the one end side of the coupling member 9 is supported by the bearing shaft member 29 with the bearing 19, the coupling member 9 is rotatable, relative to the frame 11, around the rotation center axis $\theta 1$ of the second roll 5.

To be more precise, the bearing shaft members 29 are provided on both ends of the bearing holder 27A. The bearings 19 (19A) (such as angular bearings) are provided so as to engage inner rings thereof with the respective bearing shaft members 29, and the one end side of the coupling member 9 is engaged with respective outer rings of these bearings 19. Two plate-shaped coupling member structural members 31 are provided on the one end side (the right side in FIG. 2) of the second roll 5. These coupling member structural members 31 are integrated by use of a connecting member 33, and thereby constituting the first coupling member 9A. Here, the bearings 19A that support the first coupling member 9A are located slightly outside the bearings 17A that support the second roll 5 in the direction of extension of the rotation center axis $\theta 1$ of the second roll 5 (the X-axis direction).

Similarly to the case of the one end side of the second roll 5, a bearing holder 27B supporting the other end side of the second roll 5 is also provided with the bearing shaft members 29, the bearings 19B, the coupling member structures members 31, and the connecting member 33.

One end side (the right side in FIG. 2) of the third roll 7 is rotatably supported by a bearing holder 37 (37A) with bearings 35 (35A). The bearing holder 37A is provided between the two coupling member structural members 31 located on the one end side of the second roll 5, is supported by the first coupling member (the coupling member structural members 31) 9A with an unillustrated linear guide bearing, and is movable relative to the first coupling member 9A in the radial direction of the second roll 5 (in a longitudinal direction of the first coupling member 9A).

The bearing holder 37A that supports one end side of the third roll 7 is configured to be moved in the radial direction of the second roll 5 (in a direction of approach or recession relative to the second roll 5) by an unillustrated actuator such as a cylinder.

Figure 5:
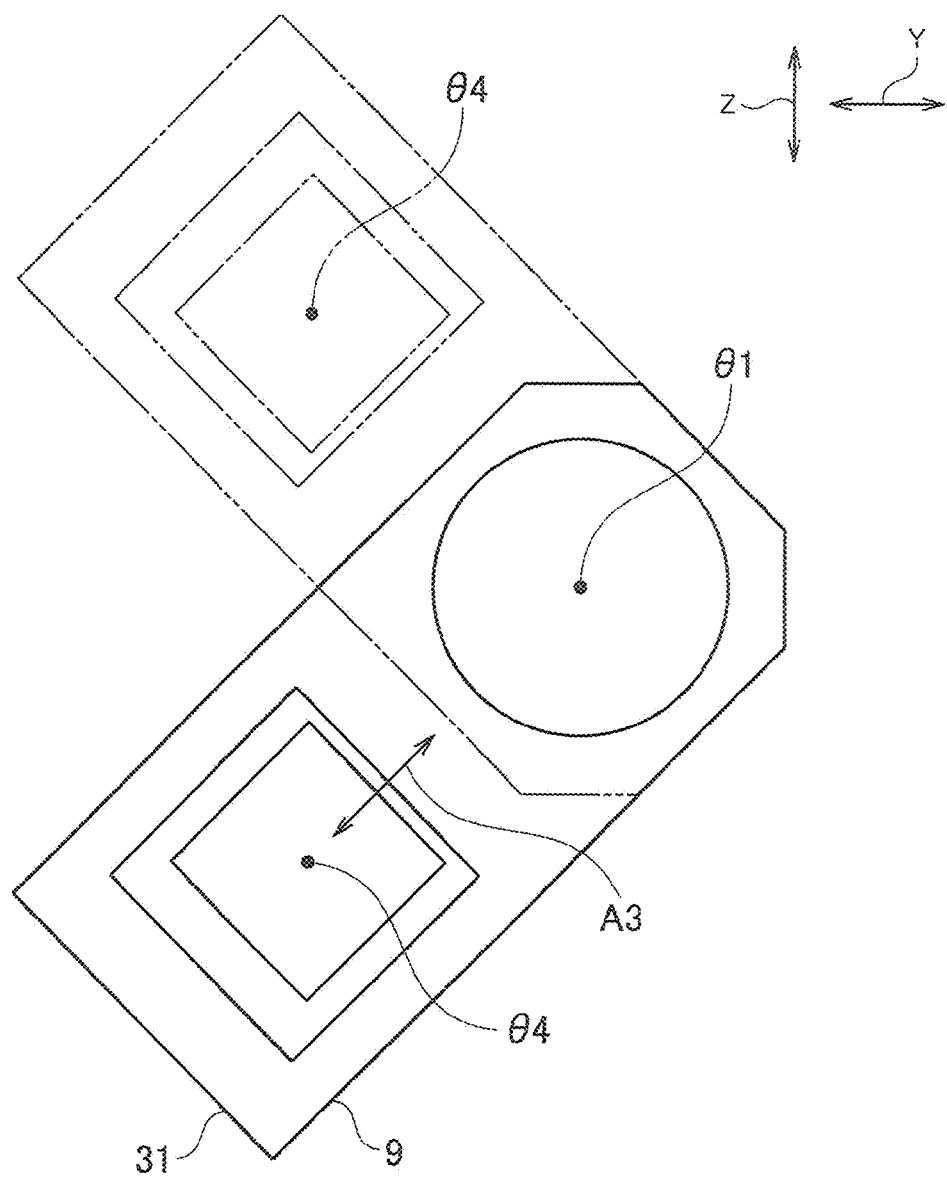
FIG. 5 is a view showing extracted illustration of a coupling member 9 and a bearing holder 37, which is the view corresponding to FIG. 1.

Another end side (the left side in FIG. 2) of the third roll 7 is also supported by bearings 35 (35B) and a bearing holder 37 (37B) as similar to the one end side of the third roll 7, and is made movable relative to the second coupling member 9B in the radial direction of the second roll 5 (in a direction of an arrow A3 indicated in FIG. 5) by an unillustrated actuator.

By applying this configuration, the third roll 7 moves between a position almost contacting the second roll 5 (a position for sandwiching the resin ST in cooperation with the second roll 5) and a position receding from the second roll 5 while maintaining a parallel condition between the rotation center axis $\theta 4$ of the third roll 7 and the rotation center axis $\theta 1$ of the second roll 5.

The coupling member supporter 13 includes a guide member (a wing; a fin) 39, for example. The guide member 39 is formed into an arc shape and is integrated with the first coupling member 9A so as to align a pivot of the arc with the rotation center axis $\theta 1$ of the second roll 5. A curvature radius of the guide member 39 is set substantially equal to, slightly greater than, or slightly smaller than the radius of the second roll 5. The guide member 39 is supported by use of a guide bearing (a linear guide bearing that includes a rail formed into an arc shape) 41 for arc motion, and the guide member 39 (the coupling member 9A) is configured to rotate, relative to the frame 11, around the rotation center axis $\theta 1$ of the second roll 5.

To be more precise, a bearing unit 43 of the guide bearing 41 for arc motion is provided integrally on the guide member 39 and a rail 45 of the guide bearing 41 for arc motion is provided integrally with a bracket 47 that is provided integrally on the frame 11. Accordingly, the guide member 39 provided integrally on the first coupling member 9A is supported by the frame 11.

Here, the guide members 39 and the guide bearings 41 for arc motion are provided on the one end side and the other end side of the second roll 5, respectively (see FIG. 2). That is, the second coupling member 9B is also supported by the frame 11 by use of the guide member 39 and the guide bearing 41 for arc motion.

In this way, the coupling member 9 is supported by the frame 11 on the one end side (on the second roll 5 side) with the bearings 19 and is also supported by the frame 11 on the other end side (the third roll 7 side) with the guide bearing 41 for arc motion.

The coupling member revolution positioning unit 15 includes an actuator (not shown) such as a servo motor, a pinion 49, and a rack wheel 51 of an arc shape which is engaged with this pinion 49, for example.

The arc-shaped rack wheel 51 is provided integrally on the guide member 39 that is provided on the one end side of the second roll 5 such that a pivot of the arc is aligned with the rotation center axis $\theta 1$ of the second roll 5. Since the rack wheel 51 is provided on an outer periphery of the guide member 39, a curvature radius of a pitch circle of the rack wheel 51 is formed slightly greater than the curvature radius of the guide member 39.

The guide member 39 provided on the other end side of the second roll 5 is similarly provided with a rack wheel 51 and a pinion 49. The pinion 49 provided on the one end side of the second roll 5 is coupled with the pinion 49 provided on the other end side of the second roll 5 by use of a coupling shaft member 53 so that the pinions 49 are configured to rotate synchronously with each other. The pinion 49 provided on the one end side of the second roll 5 is configured to be rotated around a center axis OS by the actuator such as the servo motor. Moreover, the coupling shaft member 53 is rotatably supported by the frame 11 with an unillustrated bearing.

Accordingly, the first coupling member 9A provided on the one end side of the second roll 5 and of the second coupling member 9B provided on the other end side of the second roll 5 are revolved and positioned synchronously with each other, and the third roll 7 is configured to revolve around the rotation center axis θ1 of the second roll 5 and to be positioned while maintaining a state in which the rotation center axis θ4 of the third roll 7 is parallel to the rotation center axis θ1 of the second roll 5.

Here, instead of providing the coupling shaft member 53, the guide member 39 provided on the one end side of the second roll 5 and the guide member 39 provided on the other end side of the second roll 5 may be revolved by respective actuators. Moreover, instead of the rack wheels and the pinions, a link mechanism may be used to revolve the guide member 39 (the coupling member 9).

The adjuster 21 includes a unit capable of freely moving and positioning the frame 11, relative to a floor surface FL where the sheet forming apparatus 1 is installed, in a horizontal direction (the Y-axis direction) which is orthogonal to the rotation center axes θ3, θ1, and θ4 of the respective rolls 3, 5, and 7, and a unit capable of freely revolving and positioning the frame 11, relative to the floor surface FL where the sheet forming apparatus 1 is installed, around an axis (an axis extending in the X-axis direction) parallel to the rotation center axes θ3, θ1, and θ4 of the respective rolls 3, 5, and 7.

To be more precise, the frame 11 moves in the Y-axis direction as a roll 56 located below the frame 11 rolls on a rail 55 provided on the floor surface FL, and the frame 11 is also moved and positioned in the Y-axis direction with the roll 56 rotated by an unillustrated motor or the like. Here, an operator may move and position the frame 11 manually.

The frame 11 includes actuators (or a jack and the like to be manually operated) 57 provided with a servo motor and a linier motion mechanism, for example. By driving these actuators 57, a distance between the roll 56 and the frame 11 is appropriately changed so that the frame 11 is rotated and positioned around the axis extending in the X-axis direction (see FIG. 8 and FIG. 9). Here, the actuators 57 are provided on both ends, in the Y-axis direction, of the frame 11. However, the actuator 57 may be provided only on one end.

Next, operations of the sheet forming apparatus 1 will be described.

Here, a case of setting a distance L1 between the die TD and the contact portion of the rolls 3 and 5 shorter than the state illustrated in FIG. 1 will be described below.

First, as shown in FIG. 8, one end of the frame 11 is lifted up from the floor surface FL. In this state, the contact portion of the rolls 3 and 5 does not come immediately below the die TD. Therefore, the frame 11 is appropriately moved in the Y-axis direction so as to locate the contact portion of the rolls 3 and 5 immediately below the die TD as shown in FIG. 9.

Subsequently, the third roll 7 is revolved and positioned, and the rolls 3, 5, and 7 are rotated while feeding the cooling medium to the rolls 3, 5, and 7. Then, the resin ST is extruded from the die TD and is formed into the sheet-shaped resin ST. Here, the third roll 7 is assumed to be rotated and positioned in a range between a position PS1 and a position PS2 shown in FIG. 1 (in an angular range of 90°, for example).

According to the sheet forming apparatus 1, not only one end of the coupling member 9 is supported by the bearing 19 but also the intermediate part of the coupling member 9 is supported by the bearing (the guide bearing for arc motion) 41, thereby imparting higher support stiffness to the coupling member 9. Therefore, it is possible to prevent degradation in positioning accuracy of the third roll 7 even when the resin ST is sandwiched at high pressure between the second roll 5 and the third roll 7 or when the third roll 7 has a large outside diameter. Moreover, it is possible to sandwich the resin ST accurately and to ensure transparency and homogeneity of the resin ST while avoiding crystallization of the resin ST.

In addition, according to the sheet forming apparatus 1, the coupling member 9 revolves by applying the torque to the intermediate part of the coupling member 9. Therefore, it is possible to obtain a larger torque (the torque for revolving the coupling member 9) by applying a smaller force than in the related art and thereby to ameliorate rotation and positioning of the coupling member 9. Moreover, it is easier to maintain the location of the positioned third roll 7. Furthermore, even when there is backlash between the rack wheel 51 and the pinion 49, it is possible to reduce an adverse effect (an amount of backlash in the revolving direction of the third roll 7) attributable to this backlash.

In addition, according to the sheet forming apparatus 1, the position of the bearing 17 supporting the second roll 5 and the position of the bearing 19 supporting the end side of the coupling member 9 are located substantially in the same position in the direction of extension of the rotation center axis θ1 of the second roll 5. At the same time, the coupling member 9 (the third roll 7) is supported by the four coupling member structural members 31, the respective bearings 19 supporting these coupling member structural members 31, and the guide bearings 41 for arc motion. Therefore, even when a torque around the X-axis is applied to the coupling member 9 for some reason, it is possible to minimize displacement of the coupling member 9 (the third roll 7).

In addition, as it is understood from FIG. 1, the guide member 39 is formed into the arc shape. Therefore, it is possible to achieve the compact sheet forming apparatus 1 while avoiding useless regions in light of the shape of the guide member 39.

In addition, since the sheet forming apparatus 1 includes the adjuster 21, it is possible to easily adjust the distance between the die TD and the contact portion of the first roll 3 and the second roll 7 in response to properties of the resin ST so as to maintain the state of locating the extrusion port of the die TD immediately above the contact portion of the first roll 3 and the second roll 5.

Incidentally, according to the above-described sheet forming apparatus 1, the guide member 39 and other constituents are located between the rotation center axis θ1 and the rotation center axis θ4 in the radial directions of the second roll 5 and the third roll 7 (see FIG. 1). Instead, it is possible to apply a configuration to provide the guide member 39 and other constituents outside the rotation center axis θ4 by means of increasing the radii of the guide member 39 and other constituents.

Now, a second embodiment of the present invention will be described. FIG. 10 is a side view showing a schematic configuration of a sheet forming apparatus 1a with increased radii of the guide member 39 and other constituents, which is the view corresponding to FIG. 1. FIG. 11 is a view showing a cross section taken along the XI-θ1-θ4-θ2-XI line in FIG. 10, which is the view corresponding to FIG. 2.

The sheet forming apparatus 1a is different from the sheet forming apparatus 1 shown in FIG. 1 and the like in that the radii of the guide member 39 and the rack wheel 51 are set larger and that the guide member 39 and the rack wheel 51 are provided integrally on the other end side of the coupling member 9. Other features of this sheet forming apparatus 1a are substantially similar to those in the sheet forming apparatus 1 shown above. The sheet forming apparatus 1a exerts substantially similar effects to the sheet forming apparatus 1.

Here, as it is already understood, the guide member 39 and the rack wheel 51 are located on the outside of an arc defined by revolving the center axis θ4 around the center axis θ1 (on the side away from the center axis θ1)

The present invention is not limited to the above-described embodiments and various other embodiments can be implemented with appropriate modifications.

It is also to be noted that the entire contents of Japanese Patent Application No. 2008-139631 (filed on May 28, 2008) are incorporated herein by reference.

What is claimed is:

1. A sheet forming apparatus configured to obtain a formed product in a sheet shape by cooling and solidifying molten resin, comprising:
    a first roll configured to rotate relative to a frame;
    a second roll configured to rotate relative to the frame and to sandwich sheet-shaped molten resin extruded from a die in cooperation with the first roll;
    first and second coupling members, each coupling member having a proximal end side supported by any of the frame and the second roll, the first and second coupling members being provided to be revolvable, relative to any of the frame and the second roll, around a rotation center axis of the second roll, the first coupling member being provided on one end side of the second roll and the second coupling member being provided on another end side of the second roll;
    a coupling member revolution positioning unit having a coupling shaft member configured to synchronously revolve and position the first and second coupling members by applying a torque to the first and second coupling members at an intermediate part or on a distal end side of the first and second coupling members;
    a third roll provided on the distal end side of the first and second coupling members so as to be rotatable relative to the first and second coupling members, the third roll configured to revolve around the rotation center axis of the second roll by way of revolution of the first and second coupling members and to sandwich the resin in cooperation with the second roll, the resin conveyed along an outer periphery of the second roll by rotation of the second roll after being sandwiched between the first roll and the second roll; and
    first and second coupling member supporters configured to support the first and second coupling members at an intermediate part or on the distal end side of the first and second coupling members so as to allow the first and second coupling members to revolve relative to the frame.

2. The sheet forming apparatus according to claim 1,
    wherein the second roll is rotatably supported by the frame with bearings on both end sides in a direction of extension of the rotation center axis of the second roll,
    one end side of the first coupling member is supported by the frame with a bearing provided at a position where the bearing that supports the one end side of the second roll is provided or in the vicinity of the position, in the direction of extension of the rotation center axis of the second roll,
    one end side of the second coupling member is supported by the frame with a bearing provided at a position where the bearing that supports the other end side of the second roll is provided or in the vicinity of the position, in the direction of extension of the rotation center axis of the second roll, and
    the first coupling member and the second coupling member are configured to be revolved synchronously with each other by the coupling member revolution positioning unit.

3. The sheet forming apparatus according to claim 2,
    wherein rotating center axes of the respective rolls extend in a horizontal direction and the die is provided above the first roll and the second roll,
    a molten resin extrusion port of the die is located immediately above a contact portion of the first roll and the second roll, and
    an adjuster configured to adjust a distance from the contact portion of the first roll and the second roll to the die is provided.

4. A sheet forming method to be executed by use of the sheet forming apparatus according to claim 3.

* * * * *